United States Patent [19]

Phillips et al.

[11] 4,212,784

[45] Jul. 15, 1980

[54] POLYMERIZATION OF WATER SOLUBLE POLYMERS IN WATER-IN-OIL LATEX FORM TO PRODUCE EMULSIONS CONTAINING HIGH POLYMER SOLIDS LEVELS AND LOW OIL LEVELS

[75] Inventors: Kenneth G. Phillips, River Forest; Mary E. Bingham, Palos Hills, both of Ill.

[73] Assignee: Nalco Chemical Co., Oak Brook, Ill.

[21] Appl. No.: 36,117

[22] Filed: May 4, 1979

[51] Int. Cl.$^2$ ............................................. C08L 33/02
[52] U.S. Cl. ...................... 260/29.6 WQ; 260/29.6 H
[58] Field of Search .................. 260/29.6 H, 29.6 WQ

[56] References Cited

U.S. PATENT DOCUMENTS

| | | | |
|---|---|---|---|
| Re. 28,474 | 7/1974 | Anderson | 260/29.6 H |
| Re. 28,576 | 10/1975 | Anderson | 260/29.6 H |
| 3,284,393 | 11/1966 | Vanderhoff | 260/29.6 H |
| 3,624,019 | 11/1971 | Anderson | 260/29.6 H |
| 3,734,873 | 5/1973 | Anderson | 260/29.6 H |
| 3,767,629 | 10/1973 | Vallino | 260/80.3 N |
| 3,826,771 | 7/1974 | Anderson | 260/29.6 H |
| 3,979,348 | 9/1976 | Ballweber | 260/29.6 N |
| 3,996,180 | 12/1976 | Kane | 260/29.6 WQ |
| 3,997,492 | 12/1976 | Kane | 260/29.6 WQ |
| 4,024,097 | 5/1977 | Slovinsky | 260/29.6 N |
| 4,029,622 | 6/1977 | Keller | 260/29.6 WQ |
| 4,052,353 | 10/1977 | Scanley | 260/29.6 WQ |

*Primary Examiner*—Paul R. Michl
*Attorney, Agent, or Firm*—John G. Premo; Robert A. Miller

[57] ABSTRACT

A method of producing a water-in-oil emulsion of ammonium polyacrylate which comprises polymerizing a water-in-oil emulsion of ammonium acrylate in the presence of a water-in-oil emulsifier, and a free radical polymerization catalyst with the amount of oil initially present in said emulsion being at least 15% by weight, continuing said polymerization until substantially all of the ammonium acrylate has polymerized to form ammonium polyacrylate, allowing a major portion of the oil in the oil phase of the emulsion to separate as a polymer-free upper layer, thus leaving as a lower layer a water-in-oil emulsion of ammonium polyacrylate, which emulsion contains less than 10% by weight of oil. Also described are the polymeric emulsions produced using the above described method.

2 Claims, 1 Drawing Figure

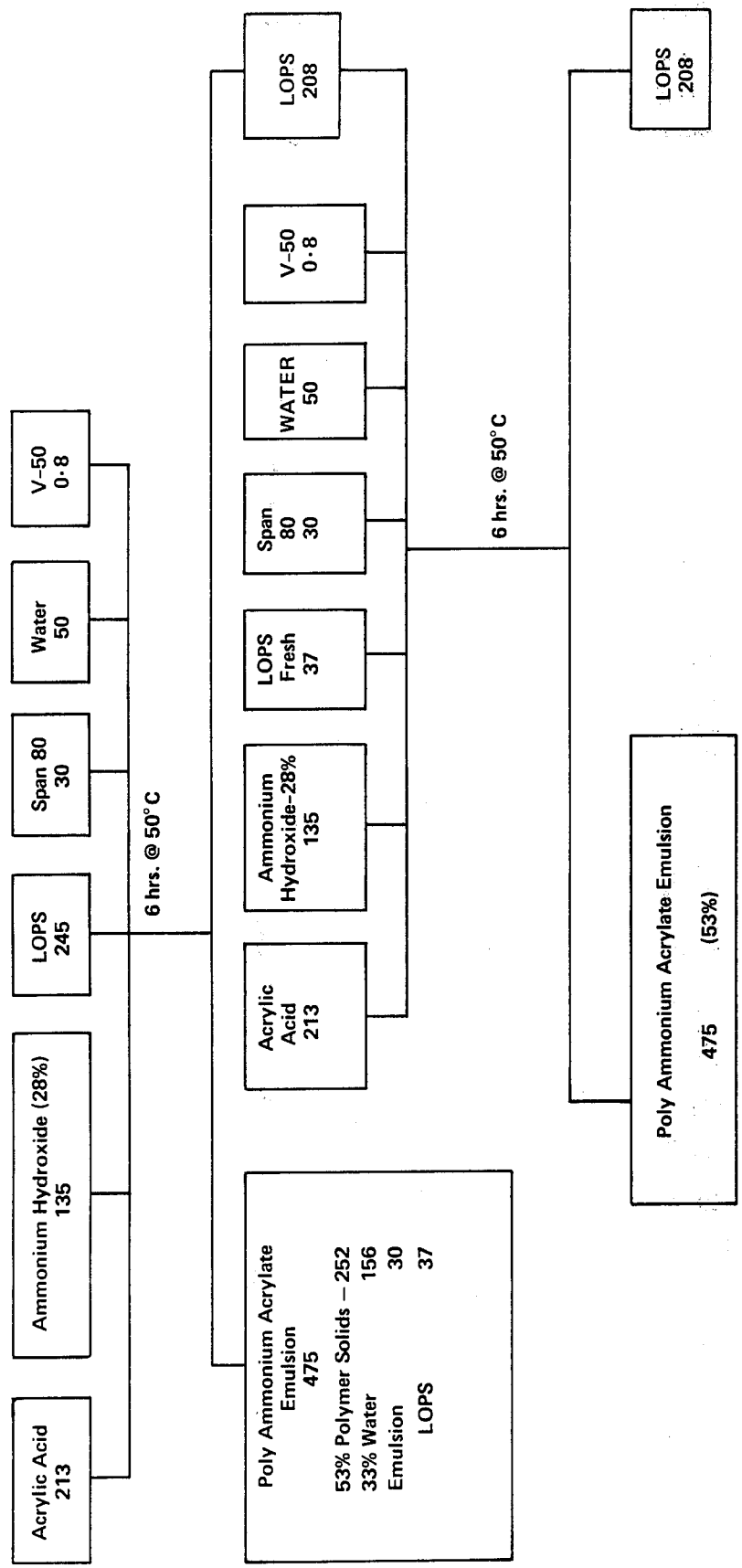

POLYMERIZATION OF WATER SOLUBLE POLYMERS IN WATER-IN-OIL LATEX FORM TO PRODUCE EMULSIONS CONTAINING HIGH POLYMER SOLIDS LEVELS AND LOW OIL LEVELS

INTRODUCTION

It is now known that water-soluble vinyl addition polymers such as polyacrylamide and its copolymers and acrylic acid salts and their copolymers may be prepared in the form of water-in-oil emulsions. See Vanderhoff, U.S. Pat. No. 3,284,393, and Anderson-Frisque, U.S. Pat. No. 3,624,019, the disclosures of which are incorporated herein by reference. As pointed out in Anderson-Frisque, U.S. Pat. No. 3,624,019, these emulsions may be added to water and inverted, whereby the polymer is released from the emulsion and is rapidly dissolved.

Commercially, these emulsions usually contain about equal parts by weight of water, polymer and oil. In order to reduce the shipping costs of these emulsions, it has been proposed to reduce their water content to a relatively low level with a corresponding increase in the oil and polymer content. This has been accomplished in the past by using distillation techniques, most often azeotropic distillation techniques. Such procedures are typified by the disclosures of U.S. Pat. No. 4,052,353 and U.S. Pat. No. 4,029,622. This method of removing water from the system requires heat and oftentimes requires the use of extraneous solvents to provide an environment for azeotropic distillation. In any event, these procedures increase the cost of the final polymer containing product.

If it were possible to produce by simple, economical means water-soluble polymers in a water-in-oil emulsion form which contained large quantities of polymer and relatively small quantities of oil, an advance in the art would be afforded.

THE INVENTION

The invention comprises a method of producing a water-in-oil emulsion of ammonium polyacrylate which comprises polymerizing a water-in-oil emulsion of ammonium acrylate in the presence of a water-in-oil emulsifier, and a free radical polymerization catalyst with the amount of oil initially present in said emulsion being at least 15% by weight, continuing said polymerization until substantially all of the ammonium acrylate has polymerized to form ammonium polyacrylate, allowing a major portion of the oil phase of the emulsion to separate as a polymer-free upper layer, thus leaving as a lower layer a water-in-oil emulsion of ammonium polyacrylate, which emulsion contains less than 10% by weight of oil.

In a preferred embodiment of the invention, the oil is recycled and additional water-in-oil polymer containing emulsion is prepared using this same oil. By using these techniques, there is provided a composition comprising a water-in-oil emulsion of ammonium polyacrylate characterized by the oil content thereof being not in excess of 10% by weight, said emulsion having been formed by the free radical polymerization of ammonium acrylate in a water-in-oil emulsion which contained originally at least 15% by weight of oil and the oil was not removed by means of distillation.

As indicated, the amount of oil present in the emulsion prior to the polymerization of the ammonium acrylate should be at least 15% by weight. Preferably, it is used in excess so as to provide between about 30%–60% by weight of the emulsion. The ammonium acrylate and the water are present in these emulsions in amounts sufficient to give a ratio of monomer to water of at least 1 and, preferably, within the range of 1:1–3:1.

THE HYDROCARBON OILS

The hydrocarbon oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the tradename "Isopar M" described in U.S. Pat. No. 3,624,019 and a paraffinic solvent sold by the Exxon Company, U.S.A., called "Low Odor Paraffinic Solvent." Typical specifications of this material are set forth below in Table I.

TABLE I

| | |
|---|---|
| Specific Gravity 60°/60° F. | 0.780–0.806 |
| Color, Saybolt | + 30 min. |
| Appearance, visual | Bright and Clear |
| Aniline Point, °F., ASTM D-611 | 160 min. |
| Distillation, °F., ASTM D-86 | |
| | IBP 365 min. |
| | FBP 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene, and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMULSIONS OF AMMONIUM POLYACRYLATE

The general method for the preparation of these emulsions is contained in Vanderhoff, U.S. Pat. No. 3,284,393. A typical procedure for preparing these emulsions includes preparing an aqueous solution of ammonium acrylate and adding it to one of the hydrocarbon oils described. With the addition of a suitable water-in-oil emulsifying agent and under agitation, the emulsion is then subjected to free radical polymerization conditions and a water-in-oil emulsion of the ammonium polyacrylate is obtained. It should be pointed out that the ingredients are chosen based upon the weight percentages given above and their compatability with each other. As to choice of free radical catalyst, these materials may be either oil or water soluble any may be from the group consisting of organic peroxides, Vazo type materials, redox type initiator systems, etc. Additionally, ultraviolet light, microwaves, etc. will also cause the polymerization of water-in-oil emulsions of this type.

In the manufacture of emulsions of this type, which are further detailed in U.S. Pat. No. 3,624,019, U.S. Pat. No. Re. 28,474, U.S. Pat. No. 3,734,873, U.S. Pat. No. Re. 28,576, U.S. Pat. No. 3,826,771, all of which are hereinafter incorporated by reference, the use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant system for the water-in-oil emulsifying agent.

Of still further interest is U.S. Pat. No. 3,997,492 which describes the formation of water-in-oil emulsions of the type above described utilizing emulsifiers having HLB values of between 4–9.

The amount of time necessary to complete the reaction will vary from as little as 2 hours to between about 6–10 hours depending upon the temperature, amount of catalyst, emulsifier concentration, etc. The temperatures used may vary between 25°–65° C. with 30°–50° C. being preferred.

While the invention is primarily directed to the production of homopolymers of ammonium acrylate, it is also useful in producing water-in-oil emulsions of ammonium acrylate copolymers which contain as little as 10% by weight of ammonium acrylate. The invention has been used to produce a copolymer of acrylamide which contained only 30% by weight of ammonium acrylate. Thus, the expression, ammonium acrylate polymers or ammonium polyacrylate as used herein, refers to both the homo and copolymers.

One of the surprising discoveries upon which the invention is predicated is that when the polymerization is complete, a relatively rapid phase separation occurs. The upper phase is primarily pure hydrocarbon liquid with the bottom phase being a water-in-oil emulsion of ammonium polyacrylate which contains 10% or less of the oil used to perform the polymerization. The oil which separates from the top of the reaction mixture is suited to the production of additional polymer in the form of a water-in-oil emulsion. These polymer-rich emulsions contain at least ⅓ more polymer than the original starting emulsion. They are capable of being inverted in accordance with the teachings of Anderson-Frisque, U.S. Pat. No. 3,624,019.

To illustrate our invention, reference should be had to the drawing which shows a typical polymerization reaction scheme which produces a low oil emulsion with the excess oil being recycled to produce additional emulsion for further polymerizations. To more specifically illustrate our invention, the following additional examples are given:

EXAMPLE 1

| Formula: | |
|---|---|
| 244.9 g | Lops |
| 29.7 g. | Span 80* |
| 274.6 g. | |
| 213.0 g. | Acrylic Acid |
| 134.8 g. | NH$_4$OH (37.7 g. as NH$_3$) |
| 50.0 g. | D. I. H$_2$O |
| 20.0 g. | V-50** (4% in H$_2$O) |
| 692.4 g. | |

*Sorbitan monooleate
**2,2-azobis-2,4-dimethyl-4-methoxy valero nitrile

Polymer = 36.2% by weight
Polymer/H$_2$O phase = 60% by weight

The emulsion polymerization technique utilized was of the type described in U.S. Pat. No. 3,979,348. Basically, the reaction media was heated to 50° C. and the catalyst added dropwise. After exotherm, the reaction media was cooled to 40° C. and maintained at this temperature for 5 hours.

After the polymerization was complete, the contents of the reaction vessel were allowed to settle for about 15 minutes. The upper phase consisted of 208 grams of polymer-free oil. The bottom layer consisted of water, oil and polymer. This bottom layer contained 37 grams of oil and all of the polymer.

EXAMPLE 2

Another run was conducted using the following change:

| Formula: | |
|---|---|
| 244.9 g. | Lops |
| 29.7 g. | Span 80 |
| 274.6 | |
| 213.0 g. | Acrylic Acid |
| 134.8 g. | NH$_4$OH (37.7 g. as NH$_3$) |
| 50.0 g. | D.I. H$_2$O |
| 15.0 g. | V-50 (4% in H$_2$O) |
| 688.4 | |

Polymer = 36.4%
Polymer/H$_2$O phase = 60.6%

This reaction was conducted using almost the same conditions as Example 1. It was heated at 60° C. for 60 hours. There was produced 626 grams of finished material. Of this, 207 grams were oil floating on top of the reaction mixture. The lower layer was polymer, oil, and water with the polymer content being 53.2% by weight of this layer.

% Pourables = 4.10/40 = 10.3%
% res. AA = 1.3

EXAMPLE 3

Using the same technique as Example 2, a 30% ammonium acrylate 70% acrylamide copolymer was prepared with the results being similar to those obtained in Example 1.

Having thus described our invention, it is claimed as follows:

1. A method of producing a water-in-oil emulsion of ammonium polyacrylate which comprises polymerizing a water-in-oil emulsion of ammonium acrylate in the presence of a water-in oil emulsifier, and a free radical polymerization catalyst with the amount of oil initially present in said emulsion being at least 15% by weight, continuing said polymerization until substantially all of the ammonium acrylate has polymerized to form ammonium polyacrylate, allowing a major portion of the oil in the oil phase of the emulsion to separate as an upper layer, thus leaving as a lower layer a water-in-oil emulsion of ammonium polyacrylate, which emulsion contains less than 10% by weight of oil.

2. The method of claim 1 where the oil is recovered from the upper layer and reused to make additional water-in-oil emulsion of ammonium polyacrylate.